United States Patent
Lin et al.

(10) Patent No.: US 9,209,682 B2
(45) Date of Patent: Dec. 8, 2015

(54) SWITCHING-MODE POWER SUPPLIES AND CONTROL METHODS THEREOF

(75) Inventors: Chien-Liang Lin, Keelung (TW); Wen-Chung Yeh, Taipei (TW)

(73) Assignee: SHAMROCK MICRO DEVICES CORP., Taipei (TW)

( * ) Notice: Subject to any disclaimer, the term of this patent is extended or adjusted under 35 U.S.C. 154(b) by 875 days.

(21) Appl. No.: 13/244,291

(22) Filed: Sep. 24, 2011

(65) Prior Publication Data

US 2013/0033211 A1    Feb. 7, 2013

(30) Foreign Application Priority Data

Aug. 4, 2011   (TW) .............................. 100127729 A

(51) Int. Cl.
*H02P 6/14* (2006.01)
*H02M 3/155* (2006.01)
*H02M 1/00* (2007.01)

(52) U.S. Cl.
CPC ...... *H02M 3/155* (2013.01); *H02M 2001/0006* (2013.01)

(58) Field of Classification Search
USPC ................................ 318/400.01, 400.26, 700
See application file for complete search history.

(56) References Cited

U.S. PATENT DOCUMENTS

| | | | |
|---|---|---|---|
| 4,521,725 A * | 6/1985 | Phaneuf ........................ 323/282 |
| 6,650,072 B2 * | 11/2003 | Harlan ........................ 318/400.2 |
| 2004/0036458 A1 * | 2/2004 | Johnson et al. ................ 323/282 |
| 2004/0080963 A1 * | 4/2004 | Grant .............................. 363/59 |

* cited by examiner

*Primary Examiner* — Kawing Chan
(74) *Attorney, Agent, or Firm* — McClure, Qualey & Rodack, LLP

(57) ABSTRACT

Disclosed include switching-mode power supplies and control methods thereof. A disclosed switching-mode power supply is coupled to an input power node and a ground node, comprising a controller, a first inductor, and a bootstrap circuit. The controller is for controlling a power switch coupled to the input power node and a connection node. The controller is powered by the connection node and an operation power node. The first inductor is coupled between the connection node and a discharge node. The bootstrap circuit is coupled between the discharge node, the operation power node and the connection node, to make an operation voltage at the operation power node substantially not less than a discharge voltage at the discharge node. The discharge node is coupled to power an output load.

17 Claims, 7 Drawing Sheets

US 9,209,682 B2

SWITCHING-MODE POWER SUPPLIES AND CONTROL METHODS THEREOF

CROSS-REFERENCE TO RELATED APPLICATION

This application claims the priority benefit of Taiwan application serial no. 100127729, filed on Aug. 4, 2011. The entirety of the above-mentioned patent application is hereby incorporated by reference herein and made a part of this specification.

BACKGROUND

The present disclosure relates generally to switching-mode power supplies and control methods thereof, and particularly to power supplies whose product sizes could be very compact.

Power supplies are almost needed for every electronic apparatus, to convert an input power from an electric grid or batteries into an output power specifically demanded by an output load. For example, an output load might be a 25-volt-driven direction-current (DC) motor, and a corresponding power supply should convert the 110V power for grid lines into an output power with steady 25V.

Conversion efficiency is a key issue for most of power supplies. Beside conversion efficiency, contemporary electronic products also concern about product cost and size, in consideration of product competitiveness and portability.

FIG. 1 shows a conventional switching-mode power supply (SMPS) 8 with flyback topology 10. SMPS 8 provides output voltage $V_{OUT}$ at output power node OUT to power output load 20. Controller 18 controls power switch 15 in flyback topology 10, making the transformer energizing or de-energizing. Operation power supplier 12 generates operation voltage $V_{CC}$ at operation power node VCC, to power controller 18.

Even though SMPS 8 is quite welcome in the art, it might induce concerns such as high product cost and size. For example, the transformer in SMPS 8 has three windings, including primary winding PRM, secondary winding SEC and auxiliary winding AUX, whose size and cost in total could be considerable. Furthermore, to regulate output voltage $V_{OUT}$ SMPS 8 commonly employs LT431 (not shown) to compare output voltage $V_{OUT}$ with a target value, and the result is transmitted, via photo coupler (not shown) to compensation node COM of controller 18. Both LT431 and photo coupler cost a lot in view of both space and price.

SUMMARY

Embodiments of the present invention disclose a switching-mode power supply, coupled to an input power node and a ground node. The switching-mode power supply comprises a controller, a first inductor, and a bootstrap circuit. The controller is for controlling a power switch coupled to the input power node and a connection node. The controller is powered by the connection node and an operation power node. The first inductor is coupled between the connection node and a discharge node. The bootstrap circuit is coupled between the discharge node, the operation power node and the connection node, to make an operation voltage at the operation power node substantially not less than a discharge voltage at the discharge node. The discharge node is coupled to power an output load.

Embodiments of the present invention disclose a control method for providing an output voltage at an output power node. A controller is powered by an operation power node and a connection node. An operation voltage at the operation power node is made substantially not less than a discharge voltage at an discharge node. A first inductor is coupled between the connection node and the discharge node. An output load is coupled between the discharge node and a ground node. The controller controls a power switch which is coupled between an input power node and the connection node. The operation voltage is raised when a connection voltage at the connection node is raised.

BRIEF DESCRIPTION OF THE DRAWINGS

The invention can be more fully understood by the subsequent detailed description and examples with references made to the accompanying drawings, wherein.

DETAILED DESCRIPTION

Figure 1:
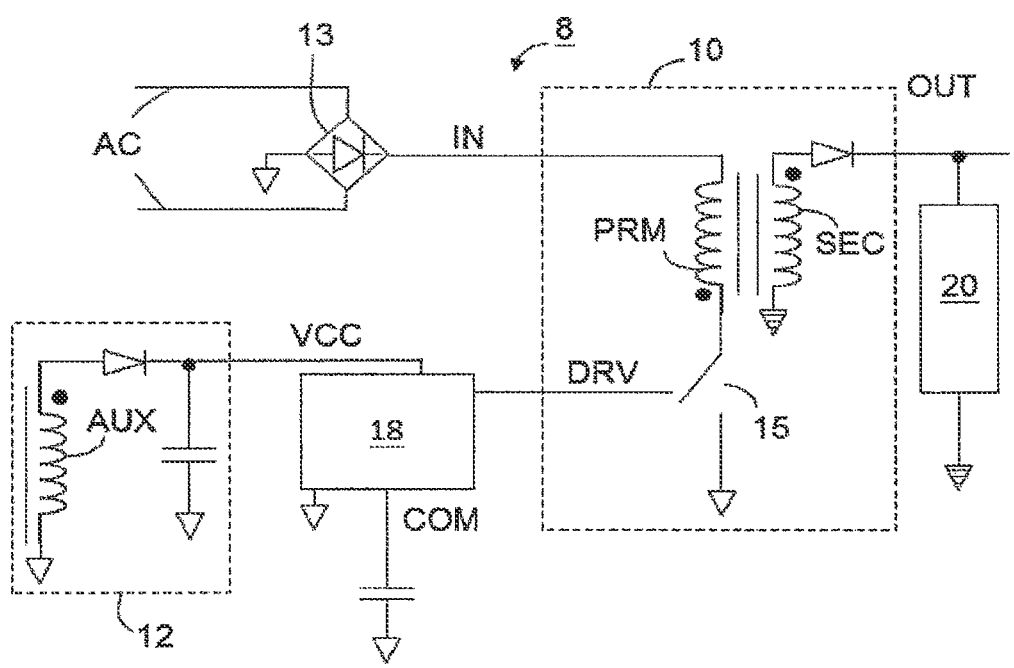
FIG. 1 shows a conventional switching-mode power supply (SMPS) with flyback topology.
Figure 2:
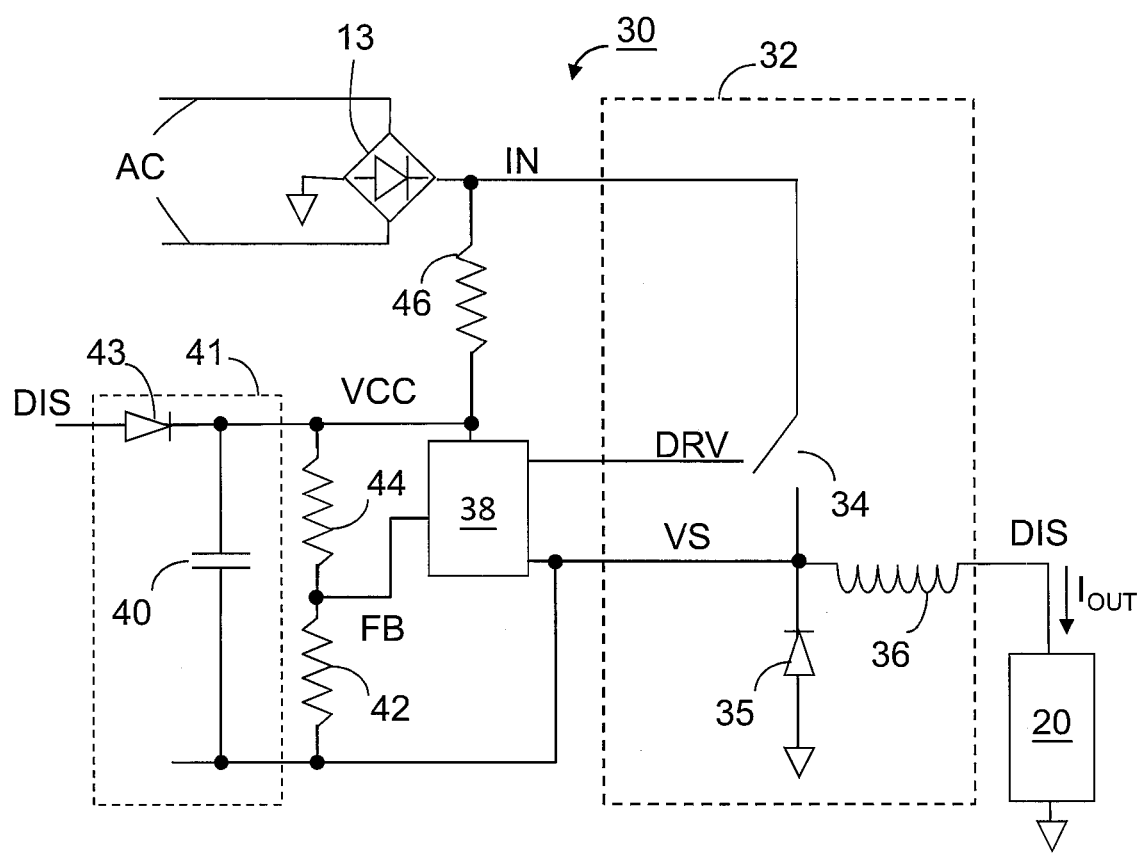
FIGS. 2 and 3 illustrate switching-mode power supplies according embodiments of the invention.

FIG. 2 illustrates switching-mode power supply 30 according one embodiment of the invention. Switching-mode power supply 30 employs buck topology 32.

Voltage of alternative current (AC) power lines from a power grid are rectified by bridge rectifier 13 to provide both input voltage $V_{IN}$ at input power node IN and virtual 0V at the ground node. Based on the power grid provided by a local city, the maximum voltage of input voltage $V_{IN}$ might range from 90V to 260V. Input voltage $V_{IN}$ might be a substantially constant value or have an M-shaped waveform.

Inside buck topology 32, power switch 34 is coupled between input power node IN and connection node VS, diode 35 between the ground node and connection node VS, and inductor 36 between discharge node DIS and connection node VS. As shown in FIG. 2, discharge node DIS and the ground node are directly connected to output load 20, such that discharge node DIS and the ground node directly power output load 20.

Via driving node DRV, controller 38 turns ON or OFF power switch 34, making it preform a short circuit or an open circuit, respectively. Controller 38 is powered by operation power node VCC and connection node VS. Voltage divider, comprising resistors 42 and 44, detects the voltage difference between operation power node VCC and connection node VS, or equivalently, the voltage drop across capacitor 40, to provide feedback voltage $V_{FB}$ at feedback node FB to controller 38. According to feedback voltage $V_{FB}$, controller 38 in one embodiment controls the duty cycle of power switch 34.

Bootstrap circuit 41 is coupled to operation power node VCC, connection node VS, and discharge node DIS. Diode 43 makes operation voltage Vcc substantially not less than discharge voltage $V_{DIS}$ at discharge node, because, in case that operation voltage Vcc is less than discharge voltage $V_{DIS}$, diode 43 is forward biased and turned on to short operation power node VCC with discharge node DIS. Capacitor 40 substantially maintains the voltage difference between operation power node VCC and connection node VS. When voltage $V_S$ at connection node VS is raised, operation voltage $V_{CC}$ is also raised because of the capacitive coupling effect provided by capacitor 40.

Startup resistor 46 is coupled between input power node IN and operation power node VCC, providing the electric power or current required during a startup period.

During a startup period when AC power lines are just connected and discharge voltage $V_{DIS}$ has not been built up, operation voltage $V_{CC}$ would be as low as 0V and power switch 34 is turned OFF. In the meantime, because of the voltage drop across startup resistor 46, startup resistor 46 starts draining current from input power node IN to charge capacitor 40. Accordingly, the voltage drop across capacitor 40 increases gradually.

At the time when the voltage drop across capacitor 40 is high enough, or exceeds 12 volt for example, controller 38 starts periodically turns power switch 34 ON and OFF.

When power switch 34 is turned ON to perform a short circuit, inductor 36 energizes and, at the same time, the current flowing through inductor 36 charges discharge node DIS to raise discharge voltage $V_{DIS}$. As power switch 34 performs a short circuit, voltage $V_S$ at connection node VS is substantially the same with input voltage $V_{IN}$ at input power node IN.

When power switch 34 is turned OFF to perform an open circuit, the current continuously flowing through inductor 36 shorts discharge node DIS to the ground node, making voltage $V_S$ substantially as low as 0V. In the meantime, if discharge voltage $V_{DIS}$ is higher than operation voltage $V_{CC}$, diode 43 is forward biased to keep operation voltage $V_{CC}$ substantially the same with discharge voltage $V_{DIS}$. Accordingly, the voltage drop across capacitor 40, or the voltage difference between operation voltage $V_{CC}$ and voltage $V_S$, is substantially the same with discharge voltage $V_{DIS}$, and is memorized by capacitor 40.

Feedback voltage $V_{FB}$ corresponds to the voltage drop across capacitor 40. In one embodiment, controller 38 controls the duty cycle of power switch 34 to make feedback voltage $V_{FB}$ approach a predetermined value $V_{PRE}$, such that the voltage drop across capacitor 40 is regulated to approach a corresponding target voltage $V_{TAR}$. For example, if the resistance ratio of resistor 44 to resistor 42 is 9:1 and the predetermined value $V_{PRE}$ is 2.5V, then both the voltage drop across capacitor 40 and discharge voltage $V_{DIS}$ will be regulated to be around 25V.

It can be seen from FIG. 2 that switching-mode power supply 30 might need only one inductor, inductor 36, for power conversion. Furthermore, photo couplers and LT431 might not be needed for the output voltage regulation in FIG. 2.

Figure 3:
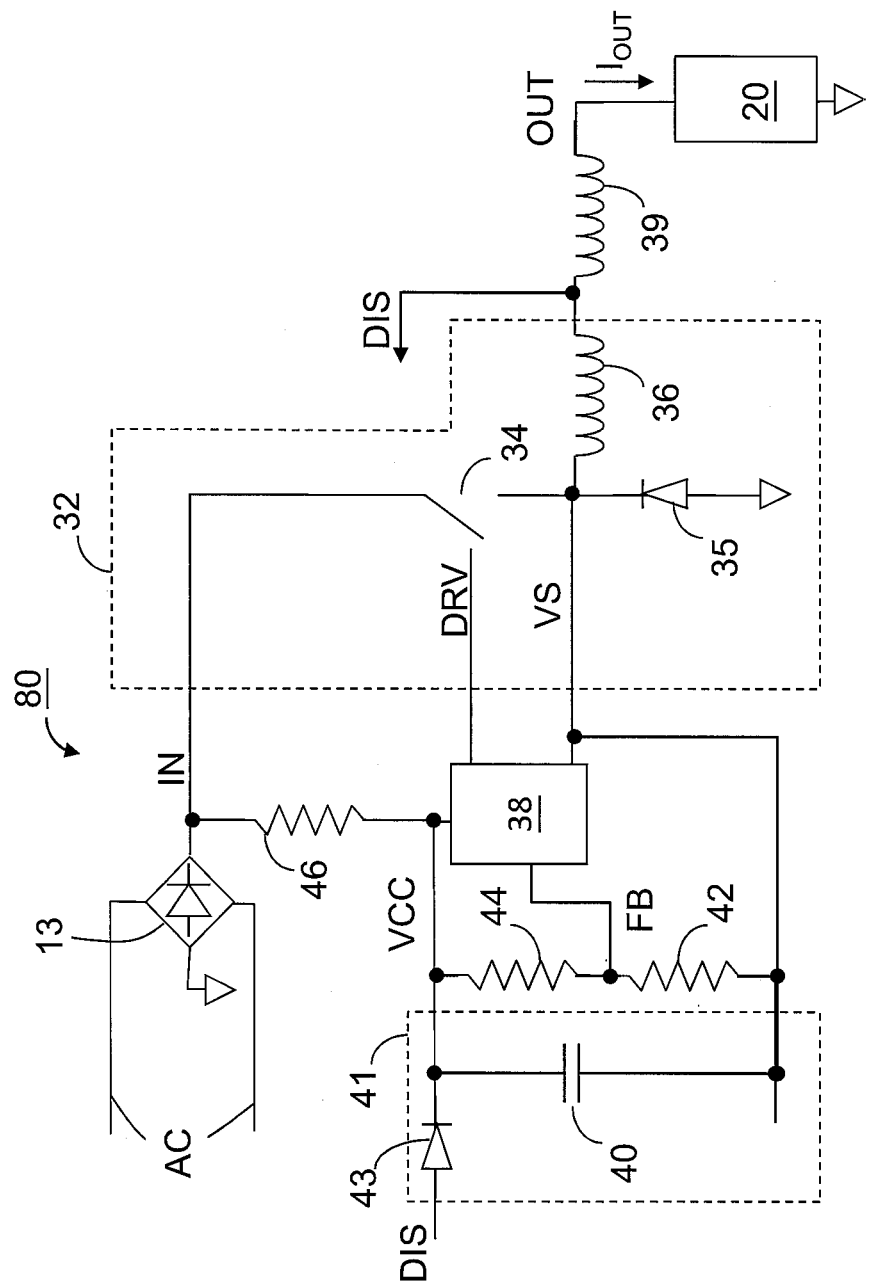

FIG. 3 illustrates switching-mode power supply 80 according another embodiment of the invention. Unlike SMPS 30 of FIG. 2, FIG. 3 has an extra inductor 39 coupled between discharge node DIS and output power node OUT. Output power node OUT couples output load 20 to inductor 39, providing output voltage $V_{OUT}$ and powering output load 20.

Inductor 39 can build up output voltage $V_{OUT}$ higher than discharge voltage $V_{DIS}$ at discharge node DIS. Supposed that the resistance ratio of resistor 44 to resistor 42 is about 9:1, controller 38 makes feedback voltage $V_{FB}$ approach 2.5, and the inductance ratio of inductor 39 to inductor 36 is about 2:1, then output voltage $V_{OUT}$ and the voltage drop across capacitor 40 will be regulated to be around 75V and 25V, respectively.

In one embodiment, controller 38 is a monolithic integrated circuit and other devices are discrete devices.

In one embodiment, output load 20 in FIG. 2 or 3 is a DC motor with a stator in a center base of a fan. To maximize the repelling area, the center base should be as small as possible. Accordingly, the space in the center base will be very limited because the center base must contain not only the windings of a stator but also a power supply circuit and a driving circuit. As shown in FIGS. 2 and 3, power supplies 30 and 80 would be very suitable for DC motors because each has a low device count of electric devices, and the resulted product could be very compact to be assembled in the space-limited center base of a DC motor.

Figure 4A:
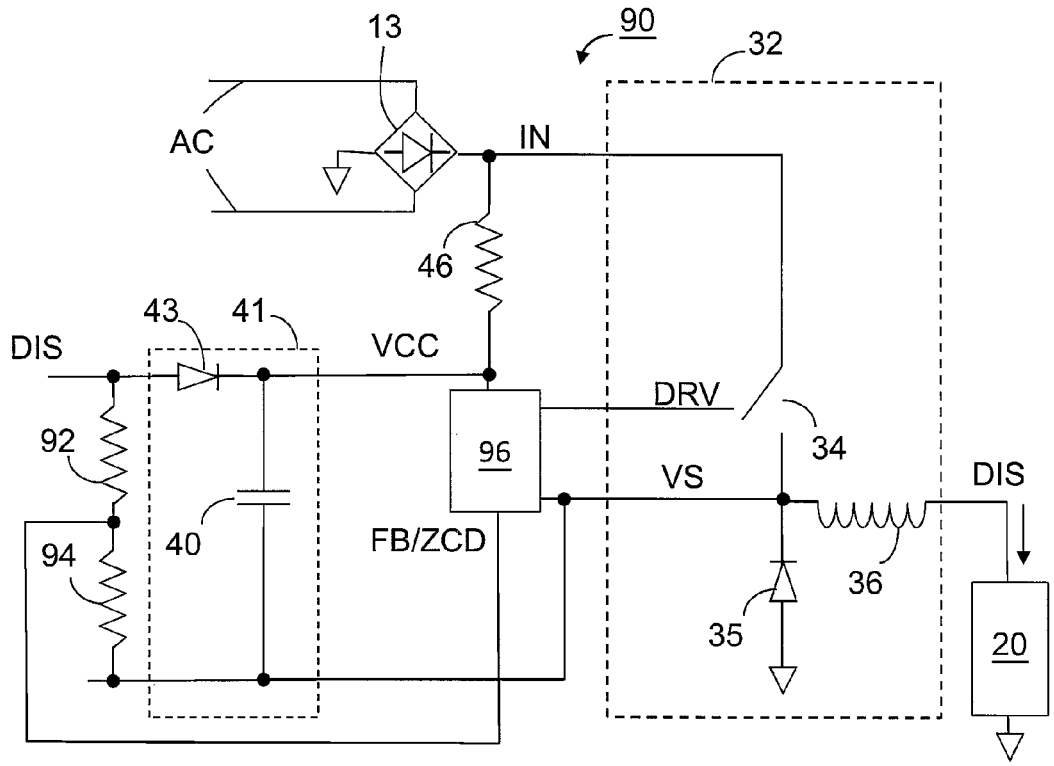
FIG. 4A illustrates a switching-mode power supply according embodiments of the invention.

FIG. 4A illustrates switching-mode power supply 90 according another embodiment of the invention. Switching-mode power supply 90 is similar with power supply 30 of FIG. 2, but employs a different control method for voltage regulation. Different from power supply 30 of FIG. 2, power supply 90 has a voltage divider, consisting of resistors 92 and 94 connected in series between discharge node DIS and connection node VS. Both resistors 92 and 94 are connected to feedback/zero-current-detection (FB/ZCD) node of controller 96. In this embodiment, factor $M_{DIV}$ is defined to be $R_{94}/(R_{92}+R_{94})$, where $R_{92}$ and $R_{94}$ are the resistance values of resistors 92 and 94 respectively. It can be derived from FIG. 4A that voltage $V_{FB/ZCD}$ at node FB/ZCD should be substantially equal to $(V_{DIS}*R_{94}+V_S*R_{92})/(R_{92}+R_{94})$.

Figure 4B:
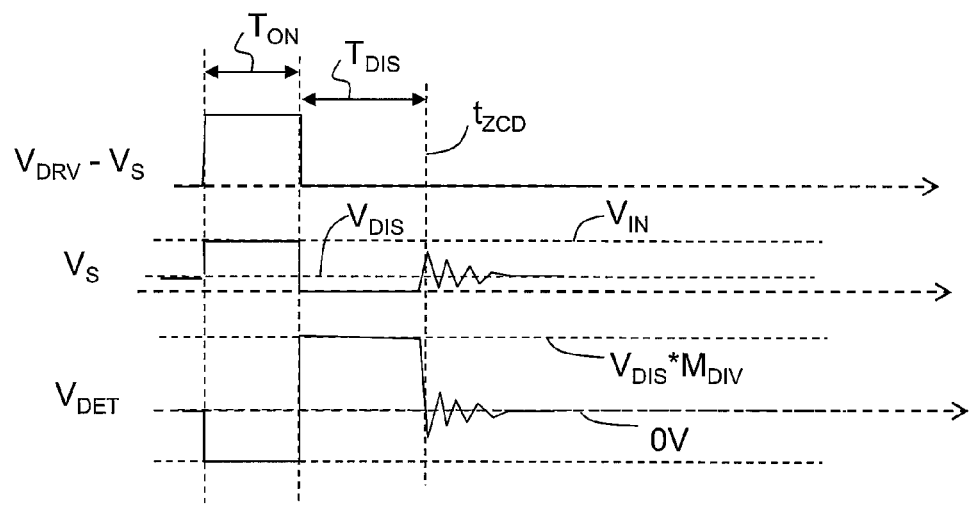
FIG. 4B demonstrates some signal waves of FIG. 4A.

FIG. 4B demonstrates some signal waves of FIG. 4A, representing, from top to bottom, the voltage difference from voltage $V_{DRV}$ at driving node DRV to voltage $V_S$ at connection node $V_S$, voltage $V_S$ at connection node $V_S$, and detection voltage $V_{DET}$, where detection voltage $V_{DET}$ is defined to be $(V_{FB/ZCD}-V_S)$, or equivalently $(V_{DIS}-V_S)*M_{DIV}$.

As shown in FIG. 4B, controller 96 outputs from driving node DRV a pulse with a width of ON time $T_{ON}$. During ON time $T_{ON}$, power switch 34 is turned ON, voltage $V_S$ should be tied to be substantially the same with input voltage $V_{IN}$ at input power node IN. In the meantime, detection voltage $V_{DET}$ is negative and inductor 36 energizes.

Right after power switch 34 is turned OFF, inductor 36 de-energizes, voltage $V_S$ is around 0V and detection voltage $V_{DET}$ is about $(V_{DIS}*M_{DIV})$. The time period when inductor 36 continues de-energizing is named as discharge time $T_{DIS}$.

When the completion of de-energizing, voltage $V_S$ drops and starts to vibrate around and converge to 0V. Accordingly, detection voltage $V_{DET}$ drops across 0V at time $t_{ZCD}$ and converges to 0V then.

To stabilize discharge voltage $V_{DIS}$, one method makes detection voltage $V_{DET}$ during discharge time $T_{DIS}$ around a constant. For instance, during discharge time $T_{DIS}$, controller 96 samples detection voltage $V_{DET}$ to provide sampled voltage $V_{SAM}$. If sampled voltage $V_{SAM}$ is under predetermined target value $V_{TAR}$, ON time $T_{ON}$ is increased. In the opposite, if sampled voltage $V_{SAM}$ exceeds predetermined target value $V_{TAR}$, ON time $T_{ON}$ is reduced. The following equation I can accordingly be derived.

$$V_{DIS}*M_{DIV}=V_{TAR} \qquad \text{I}$$

As a result, discharge voltage $V_{DIS}$ will be regulated to be around the value of $V_{TAR}/M_{DIV}$.

In one embodiment, controller 96 performs quasi-resonant control (QRcontrol). For example, time $t_{ZCD}$, when detection voltage $V_{DET}$ drops across 0V, plays as an indicator for controller 96 to start the ON time $T_{ON}$ of the next switch cycle.

Figure 5A:
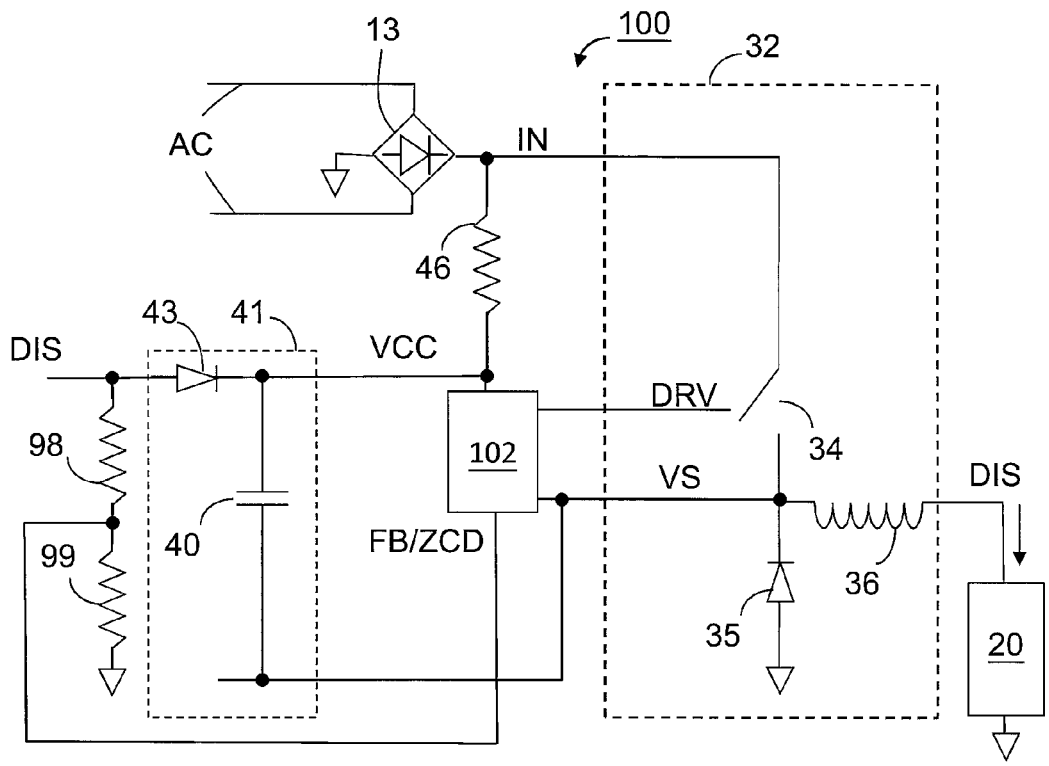
FIG. 5A illustrates a switching-mode power supply according embodiments of the invention.

FIG. 5A illustrates switching-mode power supply 100 according another embodiment of the invention. Switching-mode power supply 100 is similar with power supply 30 of FIG. 2, but employs a different control method for voltage regulation. Different from power supply 30 of FIG. 2, power supply 100 has a voltage divider, consisting of resistors 98 and 99 connected in series between discharge node DIS and the ground node. Both resistors 98 and 99 are connected to node FB/ZCD of controller 102. In this embodiment, factor $M_{DIV}$ is defined to be $R_{99}/(R_{99}+R_{98})$, where $R_{98}$ and $R_{99}$ are the resistance values of resistors 98 and 99 respectively. It can be derived from FIG. 5A that voltage $V_{FB/ZCD}$ at node FB/ZCD should be substantially equal to $V_{DIS}*M_{DIV}$.

Figure 5B:
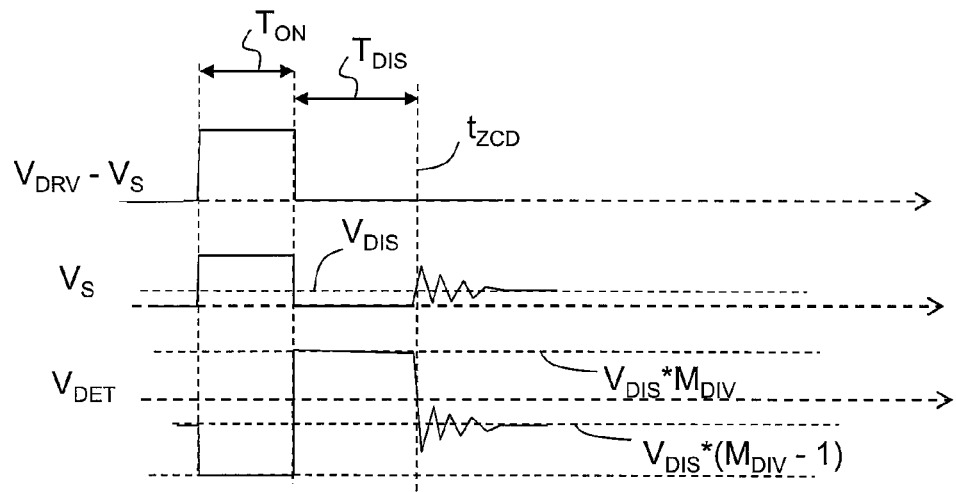
FIG. 5B demonstrates some signal waves of FIG. 5A.

FIG. 5B demonstrates some signal waves of FIG. 5A, representing, from top to bottom, the voltage difference from voltage $V_{DRV}$ at driving node DRV to voltage $V_S$ at connection node $V_S$, voltage $V_S$ at connection node $V_S$, and detection voltage $V_{DET}$, where detection voltage $V_{DET}$ is defined to be $(V_{FB/ZCD}-V_S)$, or equivalently $(V_{DIS}*M_{DIV}-V_S)$.

Persons skilled in the art can understand or derive the theory and operation of power supply 100 of FIG. 5A, based on the aforementioned disclosure and teaching regarding to FIGS. 4A and 4B. According, power supply 100 might not be detailed in consideration of brevity.

As shown in FIGS. 5A and 5B, after the completion of de-energizing, diode 35 is OFF due to the negative bias thereon, voltage $V_S$ starts to vibrate and converge to discharge voltage $V_{DIS}$. Accordingly, after dropping across 0V at time $t_{ZCD}$, detection voltage $V_{DET}$ converges and approaches to $V_{DIS}*(M_{DIV}-1)$.

In one embodiment, during discharge time $T_{DIS}$, controller 102 samples detection voltage $V_{DET}$ to provide sampled voltage $V_{SAM}$. If sampled voltage $V_{SAM}$ is under predetermined target value $V_{TAR}$, ON time $T_{ON}$ is increased. In the opposite, if sampled voltage $V_{SAM}$ exceeds predetermined target value $V_{TAR}$, ON time $T_{ON}$ is reduced. Accordingly, discharge voltage $V_{DIS}$ will be regulated to be around the value of $V_{TAR}/M_{DIV}$.

In one embodiment, controller 102 performs QR control. For example, time $t_{ZCD}$ when detection voltage $V_{DET}$ drops across 0V, is an indicator for controller 102 to start the ON time $T_{ON}$ of the next switch cycle.

In one embodiment, after discharge time $T_{DIS}$, controller 102 detects, through node FB/ZCD, discharge voltage $V_{DIS}$ to decide whether the ON time $T_{ON}$ of a next switch cycle should be started. For example, sampled voltage $V_{SAM}$, which is provided by sampling during discharge time $T_{DIS}$, might be too high, such that controller 102 enters an operation mode of skip mode or burst mode, in which power switch 34 is constantly turned OFF. As shown in FIG. 5B, the voltage or the current at node FB/ZCD could correspond to discharge voltage $V_{DIS}$ at the time after discharge time $T_{DIS}$. Accordingly, at the skip mode or burst mode, controller 102 might detect discharge voltage $V_{DIS}$ via node FB/ZCD. Once discharge voltage $V_{DIS}$ meets a predetermined condition, controller 102 could escape from the skip or burst mode and start to periodically and normally turn ON power switch 34. In one embodiment, when the absolute value of $V_{DIS}*(M_{DIV}-1)$ is detected to be under a certain value, controller 102 escapes from the skip or burst mode and enters a normal mode. In another embodiment, controller 102 could provide clamp current $I_{CLAMP}$ to avoid voltage $V_{FB/ZCD}$ from being below voltage $V_S$, and if, at the skip or burst mode, clamp current $I_{CLAMP}$ is too low, controller 102 enters a normal mode.

Figure 6:
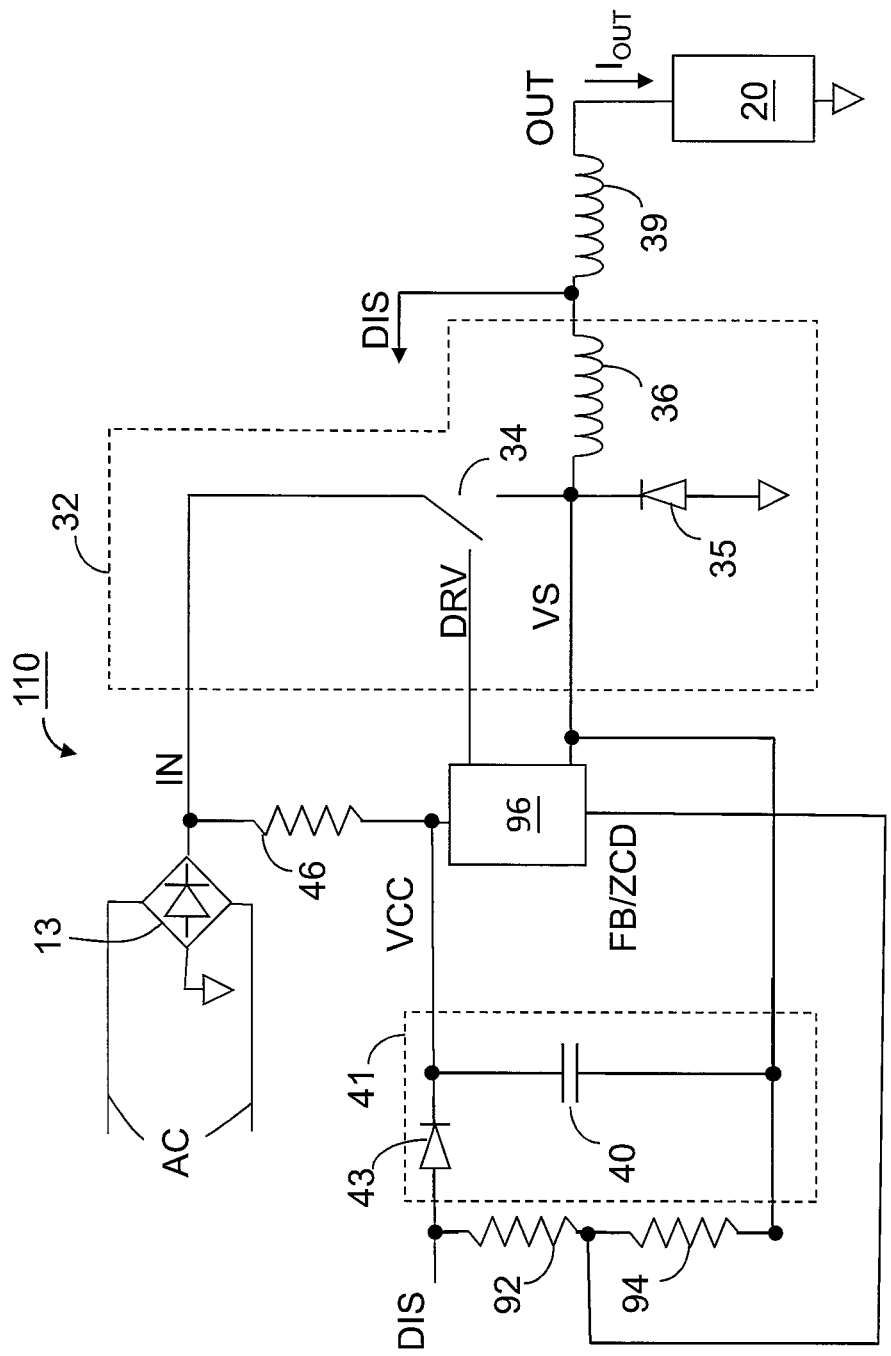
FIGS. 6 and 7 illustrates two more switching-mode power supplies according embodiments of the invention.
Figure 7:
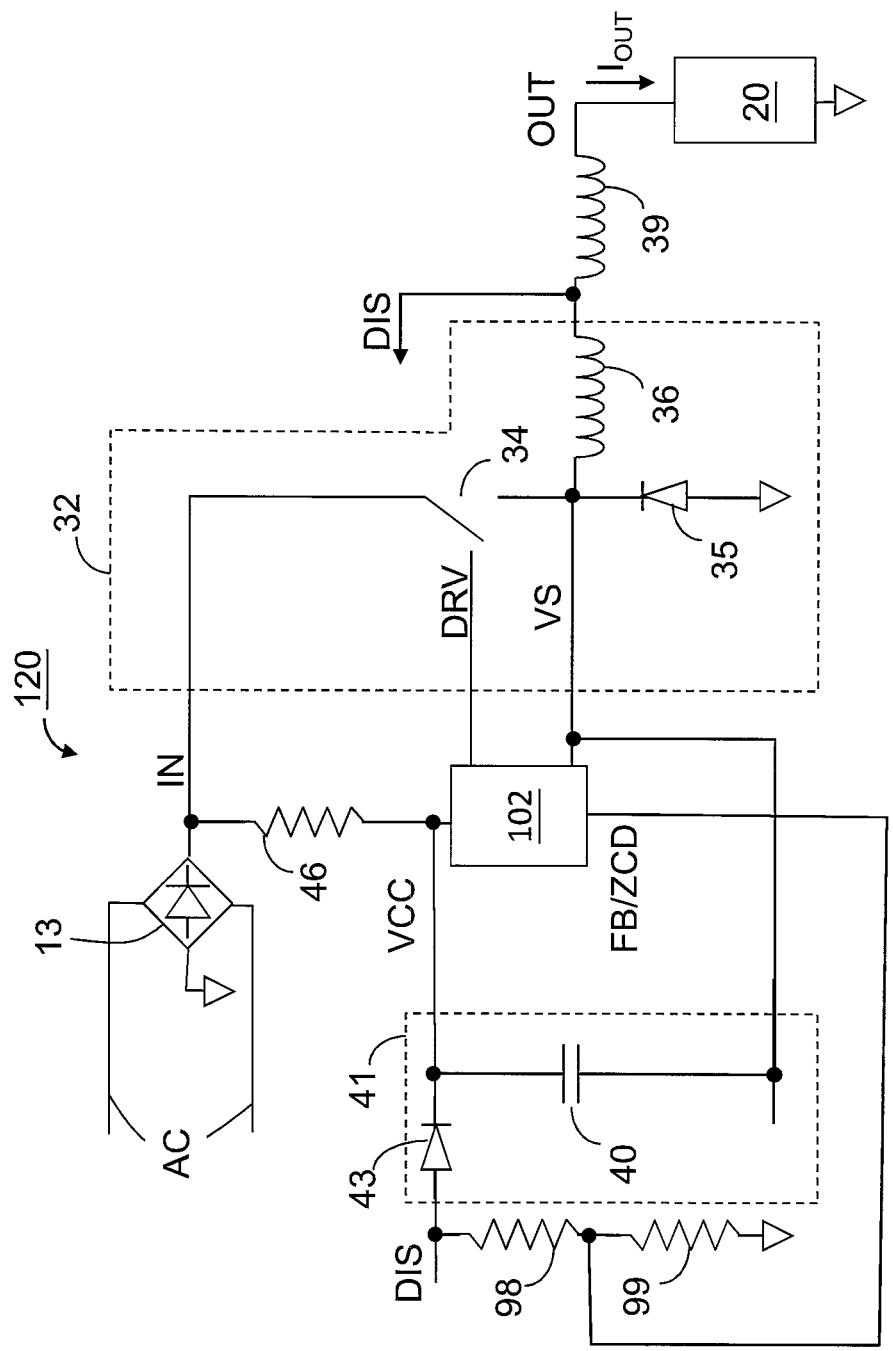

FIGS. 6 and 7 illustrate switching-mode power supplies 110 and 120, which are transformations from the power supplies of FIGS. 4A and 5A. Persons skilled in the art can understand or derive the theories and operations in power supplies 110 and 120, based on the aforementioned disclosure and teaching. According, power supplies 110 and 120 might not be detailed in consideration of brevity.

While the invention has been described by way of examples and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A switching-mode power supply, coupled to an input power node and a ground node, comprising:
    a controller, for controlling a power switch coupled to the input power node and a connection node, wherein the controller is powered by the connection node and an operation power node;
    a first inductor, coupled between the connection node and a discharge node; and
    a bootstrap circuit, coupled between the discharge node, the operation power node and the connection node, for making an operation voltage at the operation power node substantially not less than a discharge voltage at the discharge node;
    wherein the discharge node is coupled to power an output load.

2. The switching-mode power supply as claimed in claim 1, further comprising:
    a voltage divider, coupled between the operation power node and the connection node, for providing a feedback voltage to the controller;
    wherein the controller controls the power switch according to the feedback voltage.

3. The switching-mode power supply as claimed in claim 1, further comprising:
    a diode coupled between the connection node and the ground node.

4. The switching-mode power supply as claimed in claim 1, wherein the bootstrap circuit comprises:
    a diode, coupled between the operation power node and the discharge node; and
    a bootstrap capacitor, coupled between the connection node and the operation power node.

5. The switching-mode power supply as claimed in claim 1, further comprising:
    a startup resistor, coupled between the input power node and the operation power node.

6. The switching-mode power supply as claimed in claim 1, wherein the output load comprises a direct-current (DC) motor.

7. The switching-mode power supply as claimed in claim 1, further comprising:
    a second inductor coupled between the discharge node and an output power node, wherein the output load is coupled between the output power node and the ground node.

8. The switching-mode power supply as claimed in claim 1, wherein the output load is coupled between the discharge node and the ground node.

9. The switching-mode power supply as claimed in claim 1, further comprising:
    a voltage divider coupled between the discharge node and the connection node, for providing a feedback voltage to the controller.

10. The switching-mode power supply as claimed in claim 1, further comprising:
    a voltage divider coupled between the discharge node and the ground node, for providing a feedback voltage to the controller.

11. A control method for providing an output voltage at an output power node, comprising:

powering a controller by an operation power node and a connection node;

making an operation voltage at the operation power node substantially not less than a discharge voltage at an discharge node;

coupling a first inductor between the connection node and the discharge node;

coupling an output load between the discharge node and a ground node;

controlling a power switch using the controller, wherein the power switch is coupled between an input power node and the connection node; and raising the operation voltage when a connection voltage at the connection node is raised.

12. The control method as claimed in claim 11, further comprising:

detecting the operation voltage at the operation node to provide a feedback voltage;

wherein the controller controls the power switch according to the feedback voltage.

13. The control method as claimed in claim 12, wherein the controller controls the duty cycle of the power switch according to the feedback voltage.

14. The control method as claimed in claim 11, further comprising:

coupling a diode between the connection node and the ground node.

15. The control method as claimed in claim 11, further comprising:

coupling a second inductor between the discharge node and an output power node;

wherein the output load is coupled between the output power node and the ground node.

16. The control method as claimed in claim 11, further comprising:

providing a feedback voltage to the controller according to the discharge voltage at the discharge node and the connection voltage at the connection node.

17. The control method as claimed in claim 11, further comprising:

providing a feedback voltage to the controller according to the discharge voltage at the discharge node and the ground voltage at the ground node.

* * * * *